(12) United States Patent  (10) Patent No.: US 7,779,011 B2
Venkataraman et al.  (45) Date of Patent: Aug. 17, 2010

(54) METHOD AND SYSTEM FOR DYNAMICALLY PROCESSING AMBIGUOUS, REDUCED TEXT SEARCH QUERIES AND HIGHLIGHTING RESULTS THEREOF

(75) Inventors: Sashikumar Venkataraman, Bangalore (IN); Rakesh Barve, Bangalore (IN); Murali Aravamudan, Windham, NH (US); Ajit Rajasekharan, West Windsor, NJ (US)

(73) Assignee: Veveo, Inc., Andover, MA (US)

( * ) Notice: Subject to any disclaimer, the term of this patent is extended or adjusted under 35 U.S.C. 154(b) by 201 days.

(21) Appl. No.: 11/312,908

(22) Filed: Dec. 20, 2005

(65) Prior Publication Data

US 2007/0050337 A1  Mar. 1, 2007

Related U.S. Application Data

(60) Provisional application No. 60/716,101, filed on Sep. 12, 2005, provisional application No. 60/711,866, filed on Aug. 26, 2005.

(51) Int. Cl.
*G06F 7/00* (2006.01)
*G06F 17/30* (2006.01)
(52) U.S. Cl. ............................. 707/742; 707/741
(58) Field of Classification Search ............ 707/741, 707/742

See application file for complete search history.

(56) References Cited

U.S. PATENT DOCUMENTS 1,261,167 A  4/1918  Russell (Continued)

FOREIGN PATENT DOCUMENTS

EP  1050794  11/2000

(Continued)

OTHER PUBLICATIONS

Press Release From TEGIC Communications, TEGIC Communications Is Awarded Patent for Japanese T9(R) Text Input Software From the Japan Patent Office, Oct. 12, 2004. Retrieved Nov. 18, 2005 From http://www.tegic.com/press_view.html?release_num=55254242.

(Continued)

*Primary Examiner*—John R. Cottingham
*Assistant Examiner*—Mariela D Reyes
(74) *Attorney, Agent, or Firm*—Wilmer Cutler Pickering Hale and Dorr LLP

(57) ABSTRACT

A method and system are provided of processing a search query entered by a user of a device having a text input interface with overloaded keys. The search query is directed at identifying an item from a set of items. Each of the items has a name including one or more words. The system receives from the user an ambiguous search query directed at identifying a desired item. The search query comprises a prefix substring of at least one word in the name of the desired item. The system dynamically identifies a group of one or more items from the set of items having one or more words in the names thereof matching the search query as the user enters each character of the search query. The system also orders the one or more items of the group in accordance with given criteria. The names of the one or more items of the identified group are output to be displayed on the device operated by the user as ordered with the characters of the one or more words in the names corresponding to the prefix substring of the search query being highlighted.

24 Claims, 7 Drawing Sheets

U.S. PATENT DOCUMENTS

| | | | |
|---|---|---|---|
| 4,045,777 A | 8/1977 | Mierzwinski et al. | |
| 4,453,217 A | 6/1984 | Boivie | |
| 4,760,528 A | 7/1988 | Levin | |
| 4,893,238 A | 1/1990 | Venema | |
| 5,224,060 A | 6/1993 | Ma et al. | |
| 5,337,347 A | 8/1994 | Halstead-Nussloch et al. | |
| 5,369,605 A | 11/1994 | Parks | |
| 5,487,616 A | 1/1996 | Ichbiah | |
| 5,532,754 A | 7/1996 | Young et al. | |
| 5,623,406 A | 4/1997 | Ichbiah | |
| 5,635,989 A | 6/1997 | Rothmuller | |
| 5,745,889 A | 4/1998 | Burrows | |
| 5,774,588 A | 6/1998 | Li | |
| 5,802,361 A | 9/1998 | Wang et al. | |
| 5,805,155 A | 9/1998 | Allibhoy et al. | |
| 5,818,437 A | 10/1998 | Grover et al. | |
| 5,828,420 A | 10/1998 | Marshall et al. | |
| 5,828,991 A | 10/1998 | Skiena et al. | |
| 5,835,087 A | 11/1998 | Herz et al. | |
| 5,859,662 A | 1/1999 | Cragun et al. | |
| 5,880,768 A | 3/1999 | Lemmons et al. | |
| 5,912,664 A | 6/1999 | Eick et al. | |
| 5,937,422 A | 8/1999 | Nelson et al. | |
| 5,945,928 A | 8/1999 | Kushler et al. | |
| 5,945,987 A | 8/1999 | Dunn | |
| 5,953,541 A | 9/1999 | King et al. | |
| 6,005,565 A | 12/1999 | Legall et al. | |
| 6,005,597 A | 12/1999 | Barrett et al. | |
| 6,006,225 A | 12/1999 | Bowman et al. | |
| 6,009,459 A * | 12/1999 | Belfiore et al. | 709/203 |
| 6,011,554 A | 1/2000 | King et al. | |
| 6,041,311 A | 3/2000 | Chislenko et al. | |
| 6,047,300 A | 4/2000 | Walfish et al. | |
| 6,075,526 A | 6/2000 | Rothmuller | |
| 6,133,909 A | 10/2000 | Schein et al. | |
| 6,169,984 B1 | 1/2001 | Bogdan | |
| 6,184,877 B1 | 2/2001 | Dodson et al. | |
| 6,189,002 B1 | 2/2001 | Roitblat | |
| 6,223,059 B1 * | 4/2001 | Haestrup | 455/566 |
| 6,260,050 B1 | 7/2001 | Yost et al. | |
| 6,266,048 B1 | 7/2001 | Carau, Sr. | |
| 6,266,814 B1 | 7/2001 | Lemmons et al. | |
| 6,269,361 B1 | 7/2001 | Davis et al. | |
| 6,286,064 B1 | 9/2001 | King et al. | |
| 6,292,804 B1 | 9/2001 | Ardoin et al. | |
| 6,307,548 B1 | 10/2001 | Flinchem et al. | |
| 6,307,549 B1 | 10/2001 | King et al. | |
| 6,377,945 B1 | 4/2002 | Risvik | |
| 6,438,579 B1 | 8/2002 | Hosken et al. | |
| 6,438,751 B1 | 8/2002 | Voyticky et al. | |
| 6,466,933 B1 | 10/2002 | Huang et al. | |
| 6,529,903 B2 | 3/2003 | Smith | |
| 6,564,213 B1 * | 5/2003 | Ortega et al. | 707/5 |
| 6,564,313 B1 | 5/2003 | Kashyap | |
| 6,594,657 B1 | 7/2003 | Livowsky et al. | |
| 6,600,496 B1 | 7/2003 | Wagner et al. | |
| 6,614,455 B1 | 9/2003 | Cuijpers et al. | |
| 6,615,248 B1 | 9/2003 | Smith | |
| 6,631,496 B1 | 10/2003 | Li et al. | |
| 6,721,954 B1 | 4/2004 | Nickum | |
| 6,732,369 B1 | 5/2004 | Schein et al. | |
| 6,757,906 B1 | 6/2004 | Look et al. | |
| 6,766,526 B1 | 7/2004 | Ellis | |
| 6,772,147 B2 | 8/2004 | Wang | |
| 6,785,671 B1 | 8/2004 | Bailey et al. | |
| 6,801,909 B2 | 10/2004 | Delgado et al. | |
| 6,839,702 B1 * | 1/2005 | Patel et al. | 707/3 |
| 6,839,705 B1 | 1/2005 | Grooters | |
| 6,850,693 B2 | 2/2005 | Young et al. | |
| 6,865,575 B1 | 3/2005 | Smith et al. | |
| 6,865,746 B1 | 3/2005 | Herrington et al. | |
| 6,907,273 B1 | 6/2005 | Smethers | |
| 6,965,374 B2 | 11/2005 | Villet et al. | |
| 7,013,304 B1 | 3/2006 | Schuetze et al. | |
| 7,117,207 B1 | 10/2006 | Kerschberg et al. | |
| 7,130,866 B2 | 10/2006 | Schaffer | |
| 7,136,854 B2 | 11/2006 | Smith | |
| 7,146,627 B1 | 12/2006 | Ismail et al. | |
| 7,149,983 B1 | 12/2006 | Robertson et al. | |
| 7,213,256 B1 | 5/2007 | Kikinis | |
| 7,225,180 B2 | 5/2007 | Donaldson et al. | |
| 7,225,184 B2 | 5/2007 | Carrasco et al. | |
| 7,225,455 B2 | 5/2007 | Bennington et al. | |
| 7,269,548 B2 | 9/2007 | Fux et al. | |
| 7,293,231 B1 | 11/2007 | Gunn et al. | |
| 7,487,151 B2 | 2/2009 | Yamamoto et al. | |
| 7,594,244 B2 | 9/2009 | Scholl et al. | |
| 2002/0002550 A1 | 1/2002 | Berman | |
| 2002/0042791 A1 | 4/2002 | Smith et al. | |
| 2002/0052873 A1 | 5/2002 | Delgado et al. | |
| 2002/0059621 A1 | 5/2002 | Thomas et al. | |
| 2002/0083448 A1 | 6/2002 | Johnson | |
| 2002/0133481 A1 | 9/2002 | Smith et al. | |
| 2002/0144267 A1 | 10/2002 | Gutta et al. | |
| 2002/0152190 A1 | 10/2002 | Biebesheimer et al. | |
| 2002/0184373 A1 | 12/2002 | Maes | |
| 2002/0188488 A1 | 12/2002 | Hinkle | |
| 2002/0199194 A1 | 12/2002 | Ali | |
| 2003/0005452 A1 | 1/2003 | Rodriguez | |
| 2003/0005462 A1 | 1/2003 | Broadus et al. | |
| 2003/0011573 A1 | 1/2003 | Villet et al. | |
| 2003/0014753 A1 | 1/2003 | Beach et al. | |
| 2003/0023976 A1 | 1/2003 | Kamen et al. | |
| 2003/0037043 A1 | 2/2003 | Chang et al. | |
| 2003/0037333 A1 | 2/2003 | Ghashghai et al. | |
| 2003/0046698 A1 | 3/2003 | Kamen et al. | |
| 2003/0051240 A1 | 3/2003 | Schaffer et al. | |
| 2003/0066068 A1 | 4/2003 | Gutta et al. | |
| 2003/0066079 A1 | 4/2003 | Suga | |
| 2003/0084270 A1 | 5/2003 | Coon et al. | |
| 2003/0103088 A1 | 6/2003 | Dresti et al. | |
| 2003/0217121 A1 | 11/2003 | Willis | |
| 2003/0226146 A1 | 12/2003 | Thurston et al. | |
| 2003/0229900 A1 | 12/2003 | Reisman | |
| 2003/0237096 A1 | 12/2003 | Barrett et al. | |
| 2004/0013909 A1 | 1/2004 | Shimizu et al. | |
| 2004/0021691 A1 | 2/2004 | Dostie et al. | |
| 2004/0024777 A1 | 2/2004 | Schaffer | |
| 2004/0046744 A1 | 3/2004 | Rafii et al. | |
| 2004/0049783 A1 | 3/2004 | Lemmons et al. | |
| 2004/0054520 A1 | 3/2004 | Dehlinger et al. | |
| 2004/0073926 A1 | 4/2004 | Nakamura et al. | |
| 2004/0078815 A1 | 4/2004 | Lemmons et al. | |
| 2004/0078816 A1 | 4/2004 | Johnson | |
| 2004/0078820 A1 | 4/2004 | Nickum | |
| 2004/0083198 A1 | 4/2004 | Bradford et al. | |
| 2004/0093616 A1 | 5/2004 | Johnson | |
| 2004/0111745 A1 | 6/2004 | Schein et al. | |
| 2004/0128686 A1 | 7/2004 | Boyer et al. | |
| 2004/0139091 A1 | 7/2004 | Shin | |
| 2004/0143569 A1 | 7/2004 | Gross et al. | |
| 2004/0163032 A1 | 8/2004 | Guo et al. | |
| 2004/0194141 A1 | 9/2004 | Sanders | |
| 2004/0216160 A1 | 10/2004 | Lemmons et al. | |
| 2004/0220926 A1 | 11/2004 | Lamkin et al. | |
| 2004/0221308 A1 | 11/2004 | Cuttner et al. | |
| 2004/0261021 A1 | 12/2004 | Mittal et al. | |
| 2005/0015366 A1 | 1/2005 | Carrasco et al. | |
| 2005/0071874 A1 | 3/2005 | Elcock et al. | |
| 2005/0086234 A1 | 4/2005 | Tosey | |
| 2005/0086691 A1 | 4/2005 | Dudkiewicz et al. | |
| 2005/0086692 A1 | 4/2005 | Dudkiewicz et al. | |
| 2005/0174333 A1 | 8/2005 | Robinson et al. | |
| 2005/0192944 A1 | 9/2005 | Flinchem | |

| | | |
|---|---|---|
| 2005/0210020 A1 | 9/2005 | Gunn et al. |
| 2005/0210383 A1 | 9/2005 | Cucerzan et al. |
| 2005/0210402 A1 | 9/2005 | Gunn et al. |
| 2005/0223308 A1 | 10/2005 | Gunn et al. |
| 2005/0240580 A1 | 10/2005 | Zamir et al. |
| 2005/0246311 A1 | 11/2005 | Whelan et al. |
| 2005/0267994 A1 | 12/2005 | Wong et al. |
| 2005/0278175 A1 | 12/2005 | Hyvonen |
| 2005/0283468 A1 | 12/2005 | Kamvar et al. |
| 2006/0010477 A1 | 1/2006 | Yu |
| 2006/0013487 A1 | 1/2006 | Longe et al. |
| 2006/0036640 A1 | 2/2006 | Tateno et al. |
| 2006/0059044 A1 | 3/2006 | Chan et al. |
| 2006/0075429 A1 | 4/2006 | Istvan et al. |
| 2006/0090182 A1 | 4/2006 | Horowitz et al. |
| 2006/0090185 A1 | 4/2006 | Zito et al. |
| 2006/0101499 A1 | 5/2006 | Aravamudan et al. |
| 2006/0101503 A1 | 5/2006 | Venkataraman |
| 2006/0101504 A1 | 5/2006 | Aravamudan et al. |
| 2006/0112162 A1 | 5/2006 | Marot et al. |
| 2006/0117019 A1 | 6/2006 | Sylthe et al. |
| 2006/0163337 A1 | 7/2006 | Unruh |
| 2006/0167676 A1 | 7/2006 | Plumb |
| 2006/0167859 A1* | 7/2006 | Verbeck Sibley et al. ...... 707/3 |
| 2006/0173818 A1 | 8/2006 | Berstis et al. |
| 2006/0190308 A1 | 8/2006 | Janssens et al. |
| 2006/0195435 A1* | 8/2006 | Laird-McConnell et al. ... 707/4 |
| 2006/0206454 A1 | 9/2006 | Forstall et al. |
| 2006/0242178 A1 | 10/2006 | Butterfield et al. |
| 2006/0256078 A1 | 11/2006 | Flinchem et al. |
| 2006/0259344 A1 | 11/2006 | Patel et al. |
| 2006/0274051 A1 | 12/2006 | Longe et al. |
| 2006/0282856 A1 | 12/2006 | Errico et al. |
| 2007/0005526 A1 | 1/2007 | Whitney et al. |
| 2007/0005563 A1 | 1/2007 | Aravamudan |
| 2007/0016476 A1 | 1/2007 | Hoffberg et al. |
| 2007/0027852 A1 | 2/2007 | Howard et al. |
| 2007/0027861 A1 | 2/2007 | Huentelman et al. |
| 2007/0044122 A1 | 2/2007 | Scholl et al. |
| 2007/0050348 A1* | 3/2007 | Aharoni et al. ................. 707/4 |
| 2007/0061244 A1 | 3/2007 | Ramer et al. |
| 2007/0061317 A1 | 3/2007 | Ramer et al. |
| 2007/0061321 A1 | 3/2007 | Venkataraman |
| 2007/0061754 A1 | 3/2007 | Ardhanari et al. |
| 2007/0067272 A1 | 3/2007 | Flynt et al. |
| 2007/0088681 A1 | 4/2007 | Aravamudan et al. |
| 2007/0100650 A1 | 5/2007 | Ramer et al. |
| 2007/0130128 A1 | 6/2007 | Garg et al. |
| 2007/0143567 A1 | 6/2007 | Gorobets |
| 2007/0150606 A1 | 6/2007 | Flinchem et al. |
| 2007/0208718 A1 | 9/2007 | Javid et al. |
| 2007/0219984 A1 | 9/2007 | Aravamudan et al. |
| 2007/0219985 A1 | 9/2007 | Aravamudan et al. |
| 2007/0255693 A1 | 11/2007 | Ramaswamy et al. |
| 2007/0256070 A1 | 11/2007 | Bykov et al. |
| 2007/0260703 A1 | 11/2007 | Ardhanari et al. |
| 2007/0266021 A1 | 11/2007 | Aravamudan et al. |
| 2007/0266026 A1 | 11/2007 | Aravamudan et al. |
| 2007/0266406 A1 | 11/2007 | Aravamudan et al. |
| 2007/0271205 A1 | 11/2007 | Aravamudan et al. |
| 2007/0276773 A1 | 11/2007 | Aravamudan et al. |
| 2007/0276821 A1 | 11/2007 | Aravamudan et al. |
| 2007/0276859 A1 | 11/2007 | Aravamudan et al. |
| 2007/0288456 A1 | 12/2007 | Aravamudan et al. |
| 2007/0288457 A1 | 12/2007 | Aravamudan et al. |

FOREIGN PATENT DOCUMENTS

| | | |
|---|---|---|
| EP | 1143691 | 10/2001 |
| EP | 1338967 A2 | 8/2003 |
| EP | 1463307 A2 | 9/2004 |
| WO | WO-00/70505 | 11/2000 |
| WO | WO-2004/010326 | 1/2004 |
| WO | WO-2004/031931 A1 | 4/2004 |
| WO | WO-2005/033967 A3 | 4/2005 |
| WO | WO-2005/084235 A2 | 9/2005 |

OTHER PUBLICATIONS

Gadd T.N., Phonix: The Algorithm, Program 24(4), Oct. 1990, pp. 363-369.

Dalianis, Improving Search Engine Retrieval Using a Compound Splitter for Swedish, Abstract of Presentation at NODALIDA 2005—15th Nordic Conference on Computational Linguistics, Joensuu Finland, May 21-22 2005. Retrieved Jan. 5, 2006 from http://phon.joensuu.fi/nodalida/abstracts/03.shtml.

Silfverberg et al., Predicting Text Entry Speed on Mobile Phones, Proceedings of the ACM Conference on Human Factors in Computing Systems—CHI 2000. pp. 9-16.

Mackenzie et al., Letterwise: Prefix-Based Disambiguation for Mobile Text Input, Proceedings of the ACM Symposium on User Interface Software and Technology—UIST 2001, pp. 111-120.

U.S. Appl. No. 60/548,589, filed Sep. 1, 2005, Flinchem.

U.S. Appl. No. 11/855,661, Venkataraman et al.

U.S. Appl. No. 11/862,917, Aravamudan.

U.S. Appl. No. 11/939,086, Ramakrishnan et al.

U.S. Appl. No. 12/018,566, Venkataraman et al.

Ardissono, L. et al., User Modeling and Recommendation Techniques for Personalized Electronic Program Guides, Personalized Digital Television, Editors: Ardissono, et al., Kluwer Academic Press, 2004.

Digital Video Broadcasting, http://www.dvb.org (Oct. 12, 2007).

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

International Search Report, International Application No. PCT/US06/25249, mailed Jan. 29, 2008 (2 pages).

International Search Report, International Application No. PCT/US06/33204, mailed Sep. 21, 2007 (2 pages).

International Search Report, International Application No. PCT/US06/33257, mailed Mar. 26, 2008 (2 pages).

International Search Report, International Application No. PCT/US06/33258, mailed Mar. 26, 2008 (2 pages).

International Search Report, International Application No. PCT/US06/40005, mailed Jul. 3, 2007 (4 pages).

International Search Report, International Application No. PCT/US07/65703, mailed Jan. 25, 2008 (2 pages).

International Search Report, International Application No. PCT/US07/67100, mailed Mar. 7, 2008 (2 pages).

Matthom, "Text Highlighting in Search Results", Jul. 22, 2005. Available at www.matthom.com/archive/2005/07/22/text-highlighting-in-search-results; retrieved Jun. 23, 2006. (4 pages).

Mokotoff, Soundexing and Genealogy, Available at http://www.avotaynu.com/soundex.html, retrieved Mar. 19, 2008, last updated Sep. 8, 2007 (6 pages).

Review of Personalization Technologies: Collaborative Filtering vs. ChoiceStream's Attributized Bayesian Choice Modeling, Technology Brief, ChoiceStream Technologies, Cambridge, MA.

Roe, David et al., "Mapping UML Models Incorporating OCL Constraints into Object-Z", Technical Report, Sep. 2003, Department of Computing, Imperial College London (17 pages).

Talbot, David. "Soul of a New Mobile Machine." *Technology Review: The Design Issue* May/Jun. 2007. (pp. 46-53).

Wikipedia's entry for Levenshtein distance (n.d.). Retrieved Nov. 15, 2006 from http://en.wikipedia.org/wiki/Levenshtein_distance.

Written Opinion of the International Searching Authority, International Application No. PCT/US06/25249, mailed Jan. 29, 2008.

Written Opinion of the International Searching Authority, International Application No. PCT/US06/33204, mailed Sep. 21, 2007 (3 pages).

Written Opinion of the International Searching Authority, International Application No. PCT/US06/33257, mailed Mar. 26, 2008 (4 pages).

Written Opinion of the International Searching Authority, International Application No. PCT/US06/33258, mailed Mar. 26, 2008 (4 pages).

Written Opinion of the International Searching Authority, International Application No. PCT/US06/40005, mailed Jul. 3, 2007 (4 pages).

Written Opinion of the International Searching Authority, International Application No. PCT/US07/65703, mailed Jan. 25, 2008 (4 pages).

Written Opinion of the International Searching Authority, International Application No. PCT/US07/67100, mailed Mar. 7, 2008 (3 pages).

Kurapati, et al., "A Multi-Agent TV Recommender," In Proceedings of the UM 2001 Workshop "Personalization in Future TV," 2001, 8 pages.

Nardi, et al., "Integrating Communication and Information Through Contact Map," Communications of the ACM, vol. 45, No. 4, Apr. 2002, 7 pages, retrieved from URL:http://portal.acm.org/citation.cfm?id+505251>.

Supplemental European Search Report for 05826114.0 dated Aug. 20, 2009, 13 pages.

Supplemental European Search Report for 05826129.8 dated Aug. 11, 2009, 15 pages.

Supplemental European Search Report for 06838179.7 dated Dec. 9, 2009, 7 pages.

Supplemental European Search Report for 07761026.9 dated Jan. 28, 2010, 8 pages.

Turski, et al., "Inner Circle—People Centered Email Client," CHI 2005 Conference on Human Factors in Computing Systems, Apr. 2005, pp. 1845-1848, 4 pages, retrieved from URL:http://portal.acm.org/citation.cfm?id+1056808.1057037.

Zimmerman, et al., "TV Personalization System Design of a TV Show Recommender Engine and Interface," in Liliana Adrissono, Alfred Kosba, Mark Maybury (eds) Personalized Digital Television: Targeting Programs to Individual Viewers, Kluwer, 29 pages.

* cited by examiner

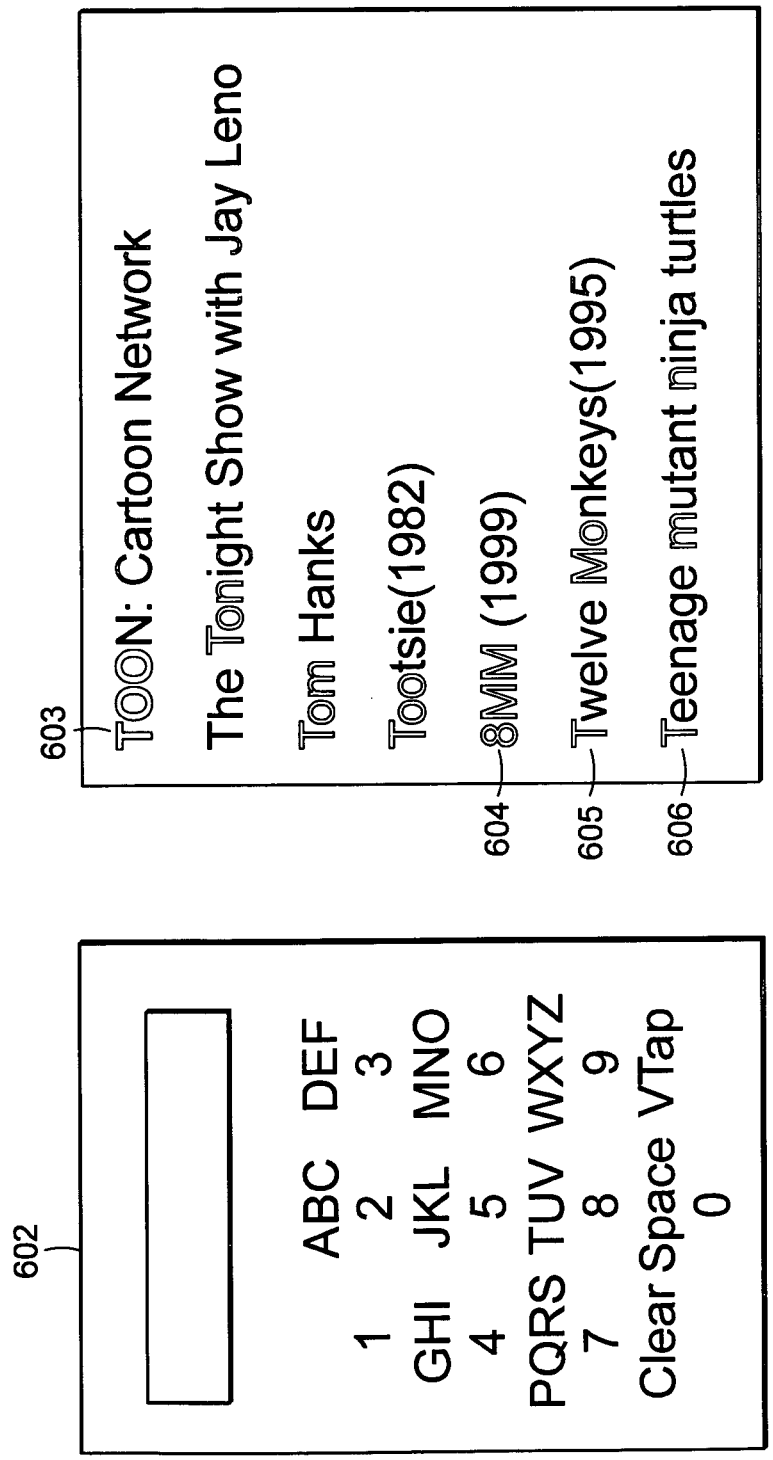

702

```
ABC  DEF
 2    3
JKL  MNO
 5    6
TUV  WXYZ
 8    9
Space VTap
  0
```

1
GHI
4
PQRS
7
Clear

USER INPUT: 866 2

Tom Cruise

Tommy Boy

Tom and jerry

Tiny Toon Adventures

Too close for comfort

Tools and Techniques

Top of the world .... Alan Grier

FIG. 7B

METHOD AND SYSTEM FOR DYNAMICALLY PROCESSING AMBIGUOUS, REDUCED TEXT SEARCH QUERIES AND HIGHLIGHTING RESULTS THEREOF

RELATED APPLICATIONS

The present invention is based on and claims priority from U.S. Patent Application No. 60/711,866, filed Aug. 26, 2005, and entitled "A Dynamic Highlighting Interface of Multi Word Prefixes of Results Obtained by Incremental Search with Reduced Text Entry on Television and Mobile Devices Using a Keypad with Overloaded Keys," and U.S. Patent Application Ser. No. 60/716,101, filed Sep. 12, 2005, and entitled "Method And System For Incremental Search With Reduced Text Entry Using A Reduced Keypad With Overloaded Keys," both of which are incorporated by reference herein in their entirety.

BACKGROUND OF THE INVENTION

1. Field of Invention

The present invention generally relates to processing search queries and, more particularly, to methods and systems for processing ambiguous, reduced text, search queries and highlighting results thereof.

2. Description of Related Art

There are many user-operated devices such as mobile phones, PDAs (personal digital assistants), and television remote control devices that have small keypads, which a user can use for text entry. In many of these devices, largely because of device size constraints, the keypad is small and has only a small number of keys, which are overloaded with alpha-numeric characters. Text input using these keypads is cumbersome.

FIG. 1 illustrates a common twelve-key keypad interface found in many cell phones and other mobile devices, and also increasingly in devices like television remote control devices. The keypad 10 includes twelve keys 12, most of which are overloaded with multiple alpha-numeric characters or functions. The same key can be pressed to enter different characters. For instance, the "2" key can be used to enter the number "2" and the letters "A", "B" and "C". Text entry using such a keypad with overloaded keys can result in an ambiguous text entry, which requires some type of a disambiguation action. For instance, with a so-called multi-press interface, a user can press a particular key multiple times in quick succession to select a desired character (e.g., to choose "B", the user would press the "2" key twice quickly, and to choose "C", the user would press the key three times quickly). Alternatively, text entry can be performed using the so-called T9 and other text input mechanisms that provide vocabulary based completion choices for each word entered. Neither of these methods is however particularly suitable for use in performing searches because of the number of steps needed to get to the result. One deficiency of the multi-press interface is that too many key strokes are needed. A drawback of applying a vocabulary based word completion interface is the need for the additional step of making a choice from a list of all possible word matches generated by the ambiguous text input. Furthermore vocabulary based word disambiguation systems are designed typically for composition applications (as opposed to search applications) where user explicitly disambiguates each word by performing a word completion action to resolve that word before proceeding to the next word in the composition. This deficiency is even more apparent for a multi-word search system where results could ideally be obtained by the entry of just a few characters. These methods suffer from the fact that the fewer the number of characters entered, the greater the ambiguity of the input. (The ambiguity decreases as the input character count increases.) This has the undesirable consequence of reducing the usefulness of a search engine that has the potential to retrieve results with just a few input characters.

BRIEF SUMMARY OF EMBODIMENTS OF THE INVENTION

In accordance with one or more embodiments of the invention, a method and system are provided of processing a search query entered by a user of a device having a text input interface with overloaded keys. The search query is directed at identifying an item from a set of items. Each of the items has a name comprising one or more words. The system receives from the user an ambiguous search query directed at identifying a desired item. The search query comprises a prefix substring of at least one word in the name of the desired item. The system dynamically identifies a group of one or more items from the set of items having one or more words in the names thereof matching the search query as the user enters each character of the search query. The system also orders the one or more items of the group in accordance with given criteria. The names of the one or more items of the identified group are output to be displayed on the device operated by the user as ordered with the characters of the one or more words in the names corresponding to the prefix substring of the search query being highlighted.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a more complete understanding of various embodiments of the present invention, reference is now made to the following descriptions taken in connection with the accompanying drawings in which:

FIGS. 6A and 6B illustrate an exemplary text input interface and a display interface, respectively. The display interface shows the results of a sample incremental search where the user has entered a single-word query in accordance with one or more embodiments of the invention.

FIGS. 7A and 7B illustrate an exemplary text input interface and a display interface, respectively. The display interface shows the results of a sample incremental search where the user has entered a multi-word query in accordance with one or more embodiments of the invention.

Like reference numerals generally refer to like elements in the drawings.

DETAILED DESCRIPTION OF THE PREFERRED EMBODIMENTS

Briefly, methods and systems are provided in accordance with various embodiments of the invention for performing searches using ambiguous text input from devices having limited text input interfaces, and highlighting results of the searches.

As described in further detail below, in accordance with various embodiments of the invention, methods and systems are provided for processing a search query entered by a user of a device having a text input interface with overloaded keys. The search query is directed at identifying an item from a set of items. Each of the items has a name comprising one or more words.

Using the text input interface, the user can enter an ambiguous search query directed at identifying a desired item. The search query comprises a prefix substring of at least one word in the name of the desired item. A prefix substring of a word is a variable length string of characters that contains fewer than all the characters making up the word.

The system dynamically identifies a group of one or more items from the set of items having one or more words in the names thereof matching said search query as the user enters each character of said search query. The group of the one or more items is displayed on the device operated by the user with the characters of the one or more words in the names corresponding to the prefix substring of the search query being highlighted. The items are preferably displayed in an order of expected interest to the user.

Figure 1:
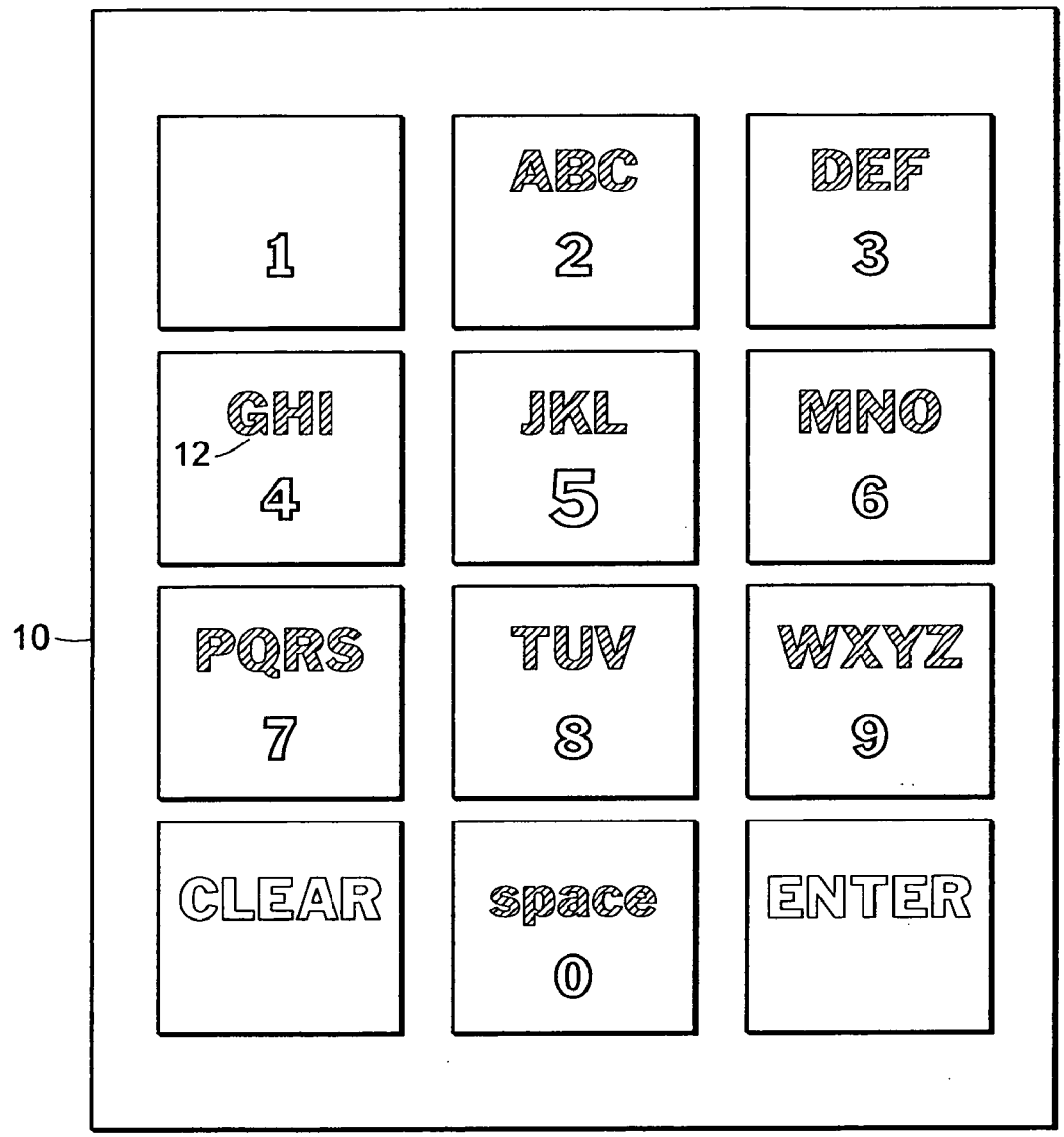
FIG. 1 illustrates a keypad with overloaded keys in accordance with the prior art.

The user types in the prefix input query by pressing overloaded keys of the text input interface once to form each character of an ambiguous query string. In accordance with one or more embodiments of the invention, the search space containing the searchable items is initially indexed by performing a many-to-many mapping from the alphanumeric space of terms to numeric strings corresponding to the various prefixes of each alphanumeric term constituting the query string. In a numeric string, each alphanumeric character in the string is replaced by its corresponding numeric equivalent based on the arrangement of characters on the keypad, e.g., the commonly used twelve-key reduced keypad shown in FIG. 1. This mapping scheme enables the system in accordance with one or more embodiments to incrementally retrieve results matching the ambiguous alphanumeric input query, as the user types in each character of the query. The user does not have to explicitly specify the termination of each word in the query to assist the system in disambiguating the input query; instead, the user only enters an input query that includes prefix substrings from the one or more words of the query. If multiple word prefixes are entered, the system can leverage off the multiple word prefixes to disambiguate it. A multiple word prefix based disambiguation method can reduce the amount of text and steps needed to enter a multiple word input query and retrieve results.

There are various possible applications for the search techniques described herein including, e.g., assisting television viewers in identifying desired television content items and channels, and assisting users of mobile devices such as cell phones and PDAs in performing searches for items in various databases (e.g., performing searches in directories of people or businesses, searching for and purchasing products/services like airline tickets, and searching for transportation schedules such as airline and train schedules, and for searching for audio and/or video content).

In the context of television systems, the term "television content items" can include a wide variety of video/audio content including, but not limited to, television shows, movies, music videos, or any other identifiable content that can be selected by a television viewer. Searching for television content items can be performed across disparate content sources including, but not limited to, broadcast television, VOD, IPTV, and PVR (local and network).

Figure 2:
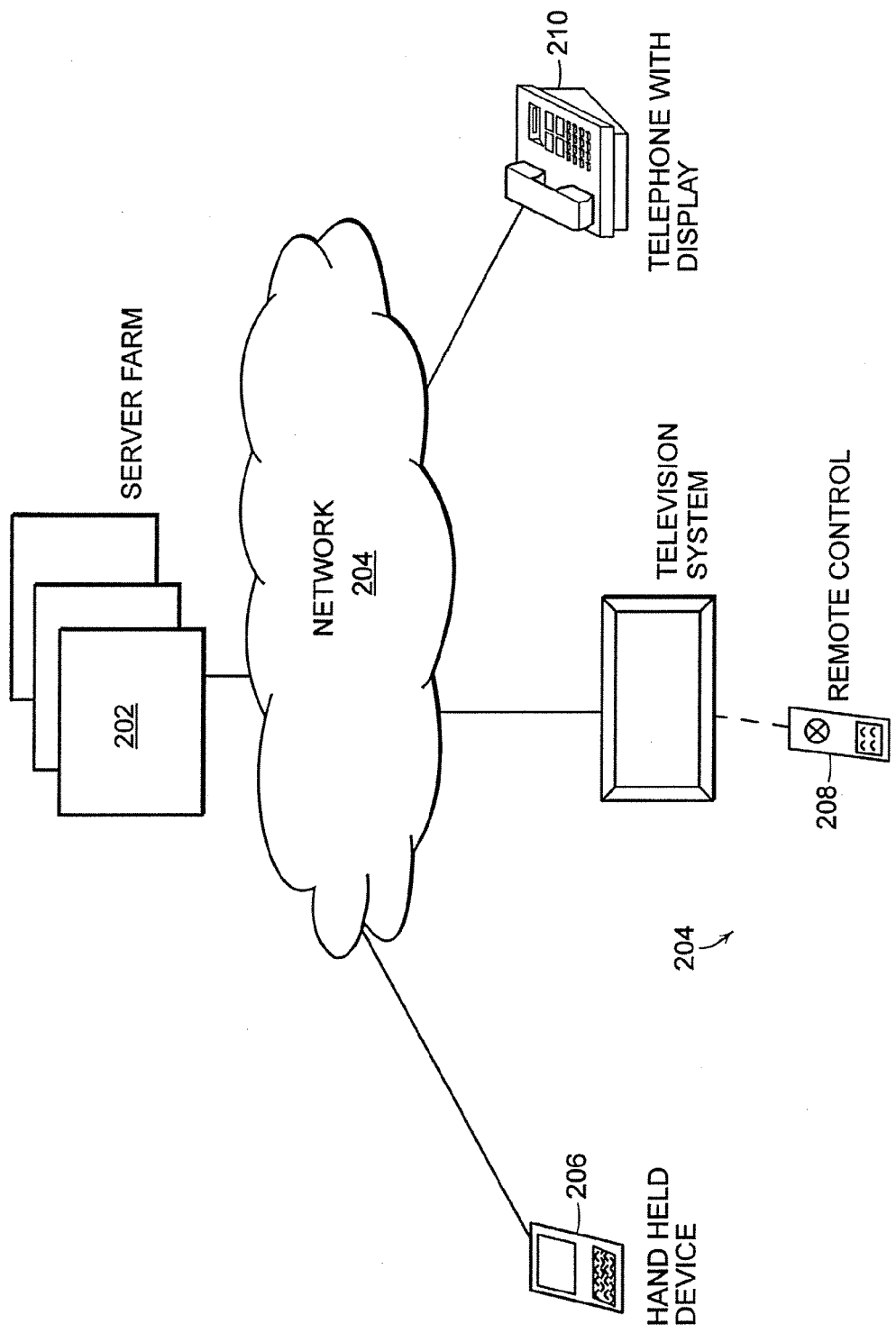
FIG. 2 illustrates a search system in accordance with one or more embodiments of the invention.

FIG. 2 schematically illustrates an overall system for performing searches with reduced text entry using various devices in accordance with one or more embodiments of the invention. The system includes a server farm or system 202, a network 204, and a variety of devices 206, 208, 210 operated by users with text input interfaces. In accordance with one or more embodiments of the invention, the server 202 processes search queries received from the user devices 206, 208, 210. In other embodiments, the search queries are processed on the devices themselves. As discussed below, the server 202 can be the source of search data and relevance updates. If part of a television system, the server 202 can also be the source of or be linked to a source of at least some of the available television content (e.g., a cable or satellite television operator) from which the user can obtain content associated with search results.

The network 204 functions as the distribution framework for transmitting data from the server 202 to the devices operated by the users. The distribution network 204 could be wired or wireless connections or some combination thereof. Examples of possible networks include computer networks, cable television networks, satellite television networks, IP-based television networks, mobile communications networks (such as, e.g., wireless CDMA and GSM networks), wired telephone networks, and IP-based wired and wireless networks.

The search devices could have a wide range of interface capabilities. A device, e.g., could be a hand-held mobile communications device 206 such as a cellular phone or PDA having a limited display size and a reduced keypad with overloaded keys. Another type of search device is a television system 204 with a remote control device 208 having an overloaded keypad. Another possible search device is a desk telephone 210 with a reduced keyboard and a small display screen.

Figure 3:
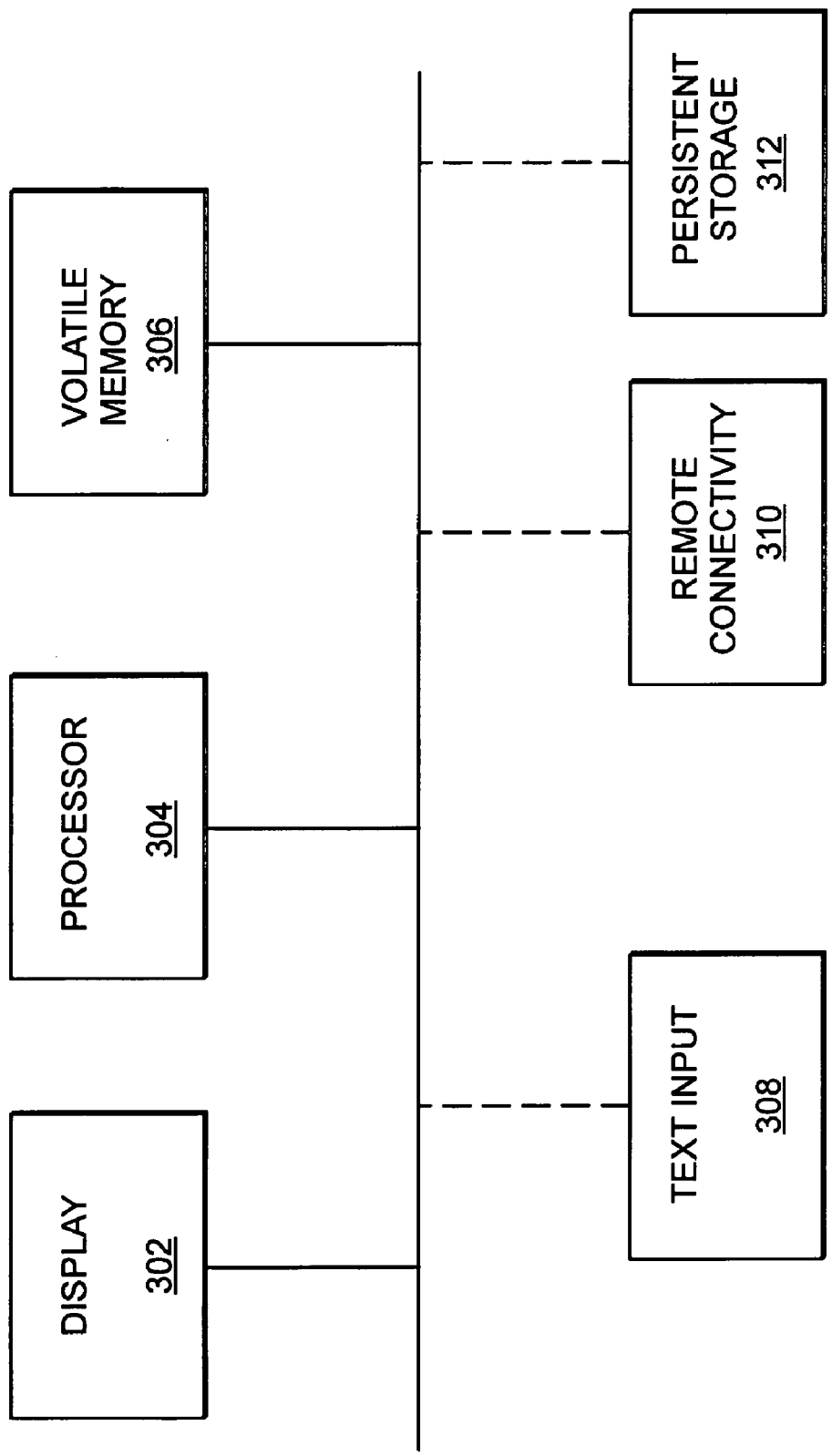
FIG. 3 illustrates exemplary device configuration options for various devices for performing searches in accordance with one or more embodiments of the invention.

FIG. 3 illustrates multiple exemplary configurations for search devices in accordance with various embodiments of the invention. In one configuration, a search device (e.g., devices 206, 208, 210) can have a display 302, a processor 304, volatile memory 306, text input interface 308, remote connectivity 310 to the server 202 through the network 204, and a persistent storage 312. A device configuration for a device such as the hand-held device 206 might not include local persistent storage 312. In this case, the device 206 could have remote connectivity 310 to submit the query to the server 202 and retrieve results from it. Another configuration of the devices 206, 208, 210 may not have remote connectivity 310. In this case, the search database may be locally resident on a local persistent storage 312. The persistent storage 312 may be, e.g., a removable storage element such as SD, SmartMedia, CompactFlash card etc. In a configuration of the device with remote connectivity 310 and persistent storage 312 for performing searches (e.g., a television system 208), the device may use the remote connectivity for search relevance data update or for the case where the search database is distributed on the local storage 312 and on the server 202. A preferred configuration in a memory constrained device is the search data residing remotely on a server. Unlike composition applications where the "most frequently used or popular terms space" are small in size and can be maintained in a local vocabulary, search spaces are typically larger inherently because people instinctively use unique word "signatures" to recall an item of interest. Hence maintaining search spaces locally may not be practical in many devices that have limited local memory, making a network based search configuration preferable.

In one exemplary embodiment, a television system 208 may have a set-top box or other device with a one-way link to a satellite network. In this configuration, all search data including relevance updates may be downloaded to the device through a satellite link to perform local searching. In this case, the set-top box preferably has sufficient storage capacity to maintain search spaces locally. Local storage is preferably large in this case to circumvent the deficiency of a one-way link.

Figure 4:
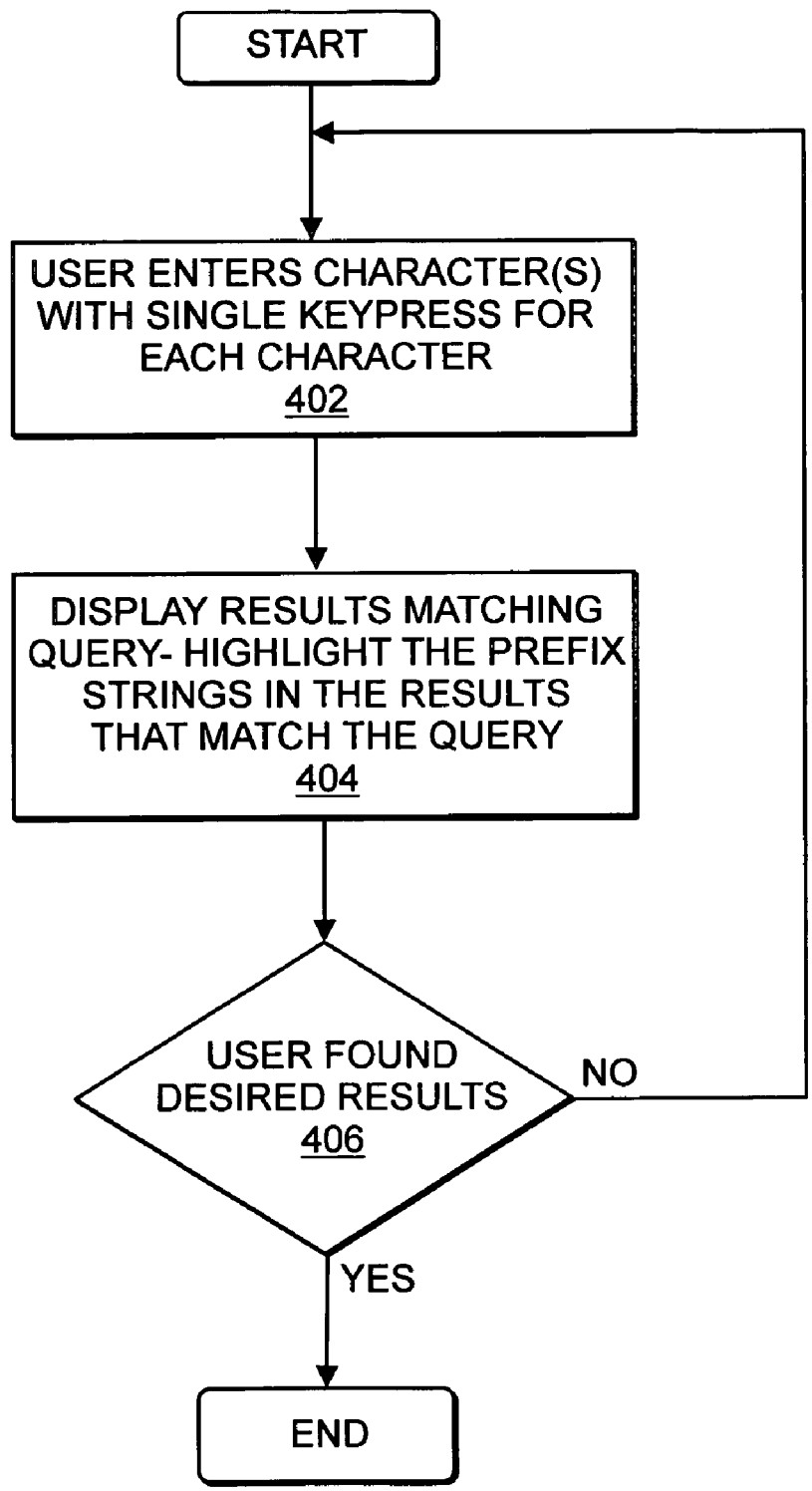
FIG. 4 is a flow chart illustrating a method for finding and highlighting results of a reduced text, ambiguous search query made using an overloaded keypad in accordance with one or more embodiments of the invention.

FIG. 4 illustrates a search process in accordance with one or more embodiments of the invention. At step 402, the user enters a character using an ambiguous text input interface, e.g., using a keypad with overloaded keys where a single key press is performed for each character entered. At 404, an incremental search system determines and displays at least some of the results that match the input character entered at 402. Since the input is ambiguous, the match of results would include the matches for all the ambiguous input characters represented by the single key press (including those not of interest to the user). To address this increased set of matches, an ordering scheme is preferably used to order the results to improve accessibility to results expected to be more of interest to the user. The ordering of results can be based on a variety of criteria including, e.g., temporal relevance, location relevance, popularity and personal preferences (that may have been determined implicitly or explicitly) or some combination of these criteria. (In a television application, temporal relevance can be used to favor programs whose timing may be more of interest to the viewer. For example, if the user entered NBA, then the system would list the games in order of temporal relevance such as those in progress or are scheduled to begin in the near future are listed at the higher on the list. The popularity criterion can be used to favor programs or channels that are more popular than others. The personal preference criterion can be used to favor programs or channels that the user has indicated preference for in prior user selections. For example, if a user frequently scrolls down to "CNBC" and selects it, the system would over time place CNBC higher in the list of results over a more generally popular channel such as CNN. Furthermore, identity independent time-based usage pattern learning algorithms can be applied in conjunction with personalization to apply the results ordering rules in an appropriate context. Also, e.g., when using a PDA or cell phone to search for a business, the system may use location relevance as part of the ordering criteria.)

In addition, other ordering schemes can be used in addition to or instead of the schemes indicated above such as character count based subspace biasing. In a character count based subspace biasing scheme, items in the search space do not have a constant relevance value, but rather have a relevance value that is a function of the number of characters entered so far in the prefix substring. In such a scheme, the search space (i.e., set of items that can be searched for) can divided into multiple subspaces. The relative relevance of a given subspace (and all the items contained therein) is dynamically boosted or suppressed as a function of the number of characters in the search query. As an example, a subspace containing television channel names might be boosted when the character count is one because television viewers might expect to find a channel with a single key press. Various examples of character count based subspace biasing are described in U.S. patent application Ser. No. 11/246,432 entitled "Method And System For Incremental Search With Reduced Text Entry Where The Relevance Of Results Is A Dynamically Computed Function Of User Input Search String Character Count" and filed on Oct. 7, 2005, which is assigned to the assignee of the present application and is incorporated by reference herein in its entirety.

The ordering criteria can also give preference to the results matching the search query based on a lexical match of the type of query input, e.g., in the following order of preference: single term prefixes, multiple term prefixes, and lastly abbreviation matches.

In accordance with various embodiments of the invention and as will be described below with reference to FIGS. 6B and 7B, the characters in the search result items that match the search prefix substring characters are highlighted to provide the user with a visual indication of the relationship between the key or keys pressed and the incremental match results. This facilitates identification by the user of the item of interest from the group of items displayed.

If the user does not find the desired results at 406, he or she can continue to enter more characters to the search query at step 402. Then at step 404, the system will perform the search based on the cumulative substring of characters of the search query entered by the user up to that point.

In the scenario where user does not reach the result due to misspelling or due to the case of a word whose uniqueness (e.g., Tom Brown, Todd Brown) is embedded in the suffix of a word in the query (as opposed to the prefix), the user would have to either go back to the first word and enter more characters or erase one or more of the typed characters and re-enter characters to reach the desired result. The dynamic highlight of the prefix strings in the results for each character entry enables the user to recover from an error during the text entry process itself, in contrast to discovering that no results match after typing the entire text.

Figure 5A:
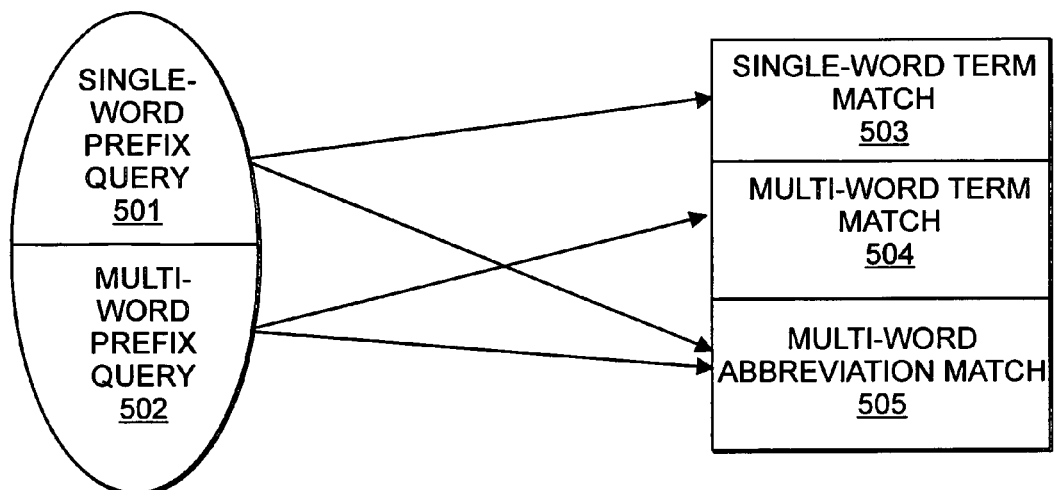
FIG. 5A illustrates the different match possibilities for a single-word and multi-word prefix query in accordance with one or more embodiments of the invention.
Figure 5B:
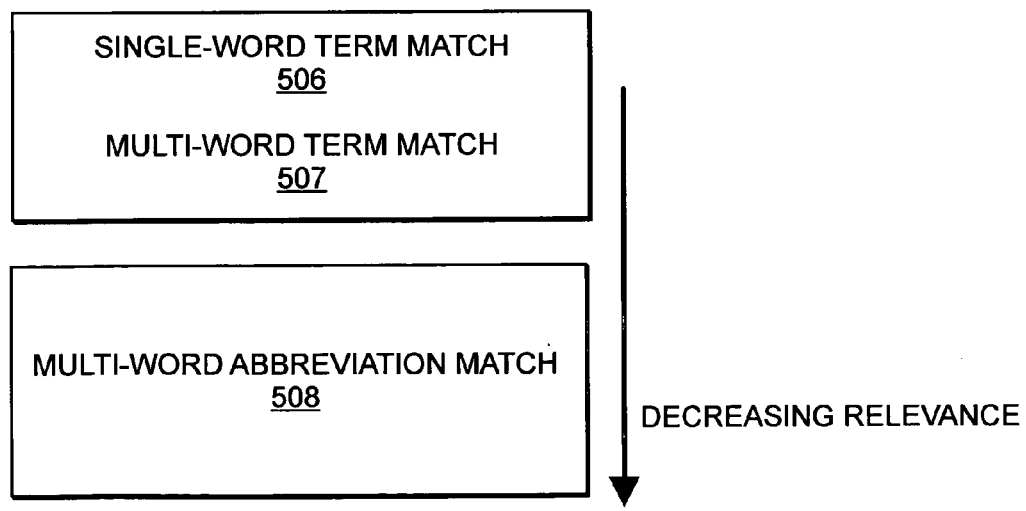
FIG. 5B illustrates possible ordering criteria for search results in accordance with one or more embodiments of the invention.

FIG. 5A illustrates the two broad categories of input queries and the various potential matches they could have in the results space. Input queries that do not include an explicit space or other break character form a single-word prefix query. A single-word query 501 can either match a single-word term 503 or an abbreviation representing multiple words 505. Input queries that explicitly include a space character or other break character between character entries form a multi-word prefix query. A multi-word prefix query 502 can match a multi-word term 504 or an abbreviation presenting multiple words. In an exemplary search of a movie database, the matches could be a direct match on terms representing a title (e.g., for the search query "go mu", a match could be the movie title Gods Must Be Crazy) or it could be matches on terms representing different types of information (e.g., if a user is searching for a movie starring Tom Hanks that features volleyball, he or she may enter the search query "to vo" to get the result: Tom Hanks Volleyball). As described earlier, these matches are then ordered in decreasing relevance, and in one or more embodiments, in the following order: single-word term matches 506 and multi-word term matches 507 followed by multi-word abbreviation matches 508 as illustrated in FIG. 5B.

FIGS. 6A and 6B illustrate an example of highlighted search results in accordance with one or more embodiments of the invention. FIG. 6A illustrates an overloaded keypad interface 602, which can in a television application, be an on-screen interface. In this example, the user has entered a single-word text input query "866" using the keypad 602. The results of the search input are shown in FIG. 6B, which shows single-word term matches 603 and 604 ordered before abbreviation matches 605 and 606. Because each key pressed by the user is overloaded and represents multiple possible search prefixes, simply displaying the text input "866" with the results will not provide the user sufficient information to associate his or her input with the match results. The "8" character entered initially by the user matches all items in the search database containing any word which begins with any of the alphanumeric characters "8", "T", "U" or "V". Examples of matches to the first character would be "8MM" 604 and "Star Trek" (not shown here since what is shown is the result of the query 866, not 8). The "6" character next entered by the user limits these search results only to items containing words that begin with the alphanumeric characters "8", "T", "U" or "V" and whose second character is one of the alphanumeric characters "6", "M", "N" or "0" or to items containing words that begin with the alphanumeric characters "8", "T", "U" or "V" and that also contain subsequent words that begin with the alphanumeric characters "6", "M", "N" or "0". The earlier match, "Star Trek", would drop out of the match results when the user pressed the overloaded "6" key because the "r" following the "T" matched by the "8" character does not match "6", "M", "N" or "0" and there are no words following "Trek" to match the "6", "M", "N" or "0".

The next "6" character entered by the user as the third overloaded character further limits the search result to only those matches that also contain the alphanumeric characters "6", "M", "N" or "0" immediately following one of the matched characters for the first "6" previously entered or that contain subsequent words that begin with the alphanumeric characters "6", "M", "N" or "0". This relationship between the overloaded characters entered by the user and the match results is complicated and not necessarily intuitive to the user. In various embodiments of the invention, the characters in the search result that match the overloaded single-word search prefix characters are highlighted, providing the user with a visual indication of the relationship between the key pressed and the incremental match results. This facilitates identification by the user of the item of interest from the group of items displayed.

The term "highlighting" as used herein refers to making more prominent or otherwise making more distinct characters of interest in the search results relative to other characters. Non-limiting examples of highlighting include bolding, italicizing, coloring, underlining, or changing font of (or some combination thereof) the characters of interest relative to the others.

In another example, FIG. 7B illustrates the results for a multi-word text input "866 2" using a 12-key keypad 702 shown in FIG. 7A. As discussed earlier, the multi-word term matches 703 are preferably ordered ahead of multi-word abbreviation matches. The difference between the single-word search illustrated in FIG. 6B and the multi-word search illustrated in FIG. 7B is that the use of an explicit word separator in the user input (in this case a space character) before the "2" entry, further limits results of the search. Only the results of the search illustrated in FIG. 6B for prefix substring "866" that also contain at least two words and in which a subsequent word begins with "2", "A", "B", or "C" are included in the results displayed to the user. A title such as "Tomb Raider" would not match the multi-word search even though the word "Tomb" matches the overloaded keys "8", "6", "6", "2" because the "2" must match the first letter in a subsequent word. As in the FIG. 6B example, the characters in the ordered result that match the multi-word overloaded search prefix characters are highlighted to provide the user with immediate feedback relating the key pressed to the incremental match results.

Methods of processing ambiguous search query inputs from users and highlighting results in accordance with various embodiments of the invention are preferably implemented in software, and accordingly one of the preferred implementations is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

The invention claimed is:

1. A method of processing unresolved keystroke entries by a user from a keypad with overloaded keys in which a given key is in fixed association with a number and at least one alphabetic character, said unresolved keystroke entries being directed at identifying an item from a set of items, each of said items being associated with information describing the item comprising one or more words, said method comprising:

indexing said items by associating subsets of said items with corresponding strings of one or more unresolved keystrokes for overloaded keys so that the subsets of items are directly mapped to the corresponding strings of unresolved keystrokes for various search query prefix substrings;

for at least one subset of items, which determining letters and numbers present in the information associated with and describing the indexed items of said subset caused said items to be associated with the strings of one or more unresolved keystrokes that are directly mapped to said subset;

subsequent to said indexing, receiving from a user a search query for desired items composed of unresolved keystrokes, said search query comprising a prefix substring for at least one word in information associated with the desired item;

in response to each unresolved keystroke, identifying and displaying the subsets of items, and information associated therewith, that are associated with the strings of one or more unresolved keystrokes received from the user based on the direct mapping of strings of unresolved keystrokes to subsets of items;

in response to each unresolved keystroke, as the identified items are displayed, highlighting the letters and numbers present in the one or more words in said information describing the identified items that were determined to have caused the displayed items to be associated with the strings of unresolved keystrokes that are directly mapped to said items received so as to illustrate to the user how the unresolved keystrokes entered match the information associated with the displayed items; and ordering the displayed items in accordance with one or more given criteria.

2. The method of claim 1 wherein said alphabetical and numeric symbols are highlighted by being colored, bolded, italicized, underlined, or changed to a different font, or some combination thereof.

3. The method of claim 1 wherein said one or more given criteria include one or more of: temporal relevance, location relevance, popularity, personal preferences and character count.

4. The method of claim 1 wherein said displayed items are ordered such that items having single-word or multi-word term matches are displayed before items having single-word or multi-word abbreviation matches.

5. The method of claim 1 wherein said search query is processed by a server system remote from said user.

6. The method of claim 1 wherein said search query is processed by a device operated by said user.

7. The method of claim 1 wherein said items comprise television content items, or a product or service sought by the user.

8. The method of claim 6 wherein said device is a cell phone, desk phone, a PDA, or a remote control device for a television.

9. A system for processing unresolved keystroke entries by a user from a keypad with overloaded keys in which a given key is in fixed association with a number and at least one alphabetic character, said unresolved keystroke entries being directed at identifying an item from a set of items, each of said items being associated with information describing the item comprising one or more words, said system comprising a computer-readable medium comprising instructions for causing a computer system to:

index said items by associating subsets of said items with corresponding strings of one or more unresolved keystrokes for overloaded keys so that the subsets of items are directly mapped to the corresponding strings of unresolved keystrokes for various search query prefix substrings;

for at least one subset of items, which determine letters and numbers present in the information associated with and describing the indexed items of said subset caused said items to be associated with the strings of one or more unresolved keystrokes that are directly mapped to said subset;

subsequent to said indexing, receive from a user a search query for desired items composed of unresolved keystrokes, said search query comprising a prefix substring for at least one word in information associated with the desired item;

in response to each unresolved keystroke, identify and display on a display device at least one of the subsets of items, and information associated therewith, that are associated with the strings of one or more unresolved keystrokes received from the user based on the direct mapping of strings of unresolved keystrokes to subsets of items;

in response to each unresolved keystroke, as the identified items are displayed, highlight on the display device the letters and numbers present in the one or more words in said information describing the identified items that were determined to have caused the displayed items to be associated with the unresolved keystrokes received so as to illustrate to the user how the strings of unresolved keystrokes that are directly mapped to said items entered match the information associated with the displayed items; and order on the display device the displayed items in accordance with one or more given criteria.

10. The system of claim 9 wherein said alphabetical and numeric symbols are highlighted by being colored, bolded, italicized, underlined, or changed to a different font, or some combination thereof.

11. The system of claim 9 wherein said one or more given criteria include one or more of: temporal relevance, location relevance, popularity, personal preferences and character count.

12. The system of claim 9 wherein said displayed items are ordered such that items having single-word or multi-word term matches are displayed before items having single-word or multi-word abbreviation matches.

13. The system of claim 9 wherein said computer system comprises a server system remote from said user.

14. The system of claim 9 wherein said computer system is incorporated in or proximate a device operated by said user.

15. The system of claim 9 wherein said items comprise television content items, or a product or service sought by the user.

16. The system of claim 14 wherein said device is a cell phone, desk phone, a PDA, or a remote control device for a television.

17. A computer program product for processing unresolved keystroke entries by a user from a keypad with overloaded keys in which a given key is in fixed association with a number and at least one alphabetic character, said unresolved keystroke entries being directed at identifying an item from a set of items, each of said items being associated with information describing the item comprising one or more words, said computer program product residing on a computer readable medium having a plurality of instructions stored thereon which, when executed by a processor, cause the processor to:

index said items by associating subsets of said items with corresponding strings of one or more unresolved keystrokes for overloaded keys so that the subsets of items are directly mapped to the corresponding strings of unresolved keystrokes for various search query prefix substrings;

for at least one subset of items, which determine letters and numbers present in the information associated with and describing the indexed items of said subset caused said items to be associated with the strings of one or more unresolved keystrokes that are directly mapped to said subset;

subsequent to said indexing, receive from a user a search query for desired items composed of unresolved keystrokes, said search query comprising a prefix substring for at least one word in information associated with the desired item;

in response to each unresolved keystroke, identify and display at least one of the subsets of items, and information associated therewith, that are associated with the strings of one or more unresolved keystrokes received from the user based on the direct mapping of strings of unresolved keystrokes to subsets of items;

in response to each unresolved keystroke, as the identified items are displayed, highlight the letters and numbers present in the one or more words in said information describing the identified items that were determined to have caused the displayed items to be associated with the strings of unresolved keystrokes that are directly mapped to said items received so as to illustrate to the user how the unresolved keystrokes entered match the information associated with the displayed items; and order the displayed items in accordance with one or more given criteria.

18. The computer program product of claim 17 wherein said alphabetical and numeric symbols are highlighted by being colored, bolded, italicized, underlined, or changed to a different font, or some combination thereof.

19. The computer program product of claim 17 wherein said one or more given criteria include one or more of: temporal relevance, location relevance, popularity, personal preferences and character count.

20. The computer program product of claim 17 wherein said displayed items are ordered such that items having single-word or multi-word term matches are displayed before items having single-word or multi-word abbreviation matches.

21. The computer program product of claim 17 wherein said search query is processed by a server system remote from said user.

22. The computer program product of claim 17 wherein said search query is processed by a device operated by said user.

23. The computer program product of claim 17 wherein said items comprise television content items, or a product or service sought by the user.

24. The computer program product of claim 22 wherein said device is a cell phone, desk phone, a PDA, or a remote control device for a television.

* * * * *

UNITED STATES PATENT AND TRADEMARK OFFICE
CERTIFICATE OF CORRECTION

| | | |
|---|---|---|
| PATENT NO. | : 7,779,011 B2 | Page 1 of 1 |
| APPLICATION NO. | : 11/312908 | |
| DATED | : August 17, 2010 | |
| INVENTOR(S) | : Sashikumar Venkataraman et al. | |

It is certified that error appears in the above-identified patent and that said Letters Patent is hereby corrected as shown below:

In the Claims:

At column 8, claim 1, line 53, "which determining letters" should read --determining which letters--.

At column 9, claim 1, line 9, "mapped to said items received so" should read --mapped to said items so--.

At column 9, claim 9, line 52, "which determine letters" should read --determine which letters--.

At column 10, claim 17, line 54, "which determine letters" should read --determine which letters--.

At column 11, claim 17, line 10, "mapped to said items received so" should read --mapped to said items so--.

Signed and Sealed this
Fifteenth Day of February, 2011

David J. Kappos
*Director of the United States Patent and Trademark Office*